United States Patent [19]
Sun et al.

[11] Patent Number: 5,903,759
[45] Date of Patent: May 11, 1999

[54] SOFTWARE PERFORMANCE ANALYSIS USING HARDWARE ANALYZER

[75] Inventors: Tsyr-Shya Joe Sun, Milpitas; Dar-Ren Leu, San Jose, both of Calif.

[73] Assignee: 3 Com Corporation, Santa Clara, Calif.

[21] Appl. No.: 08/868,573

[22] Filed: Jun. 4, 1997

[51] Int. Cl.⁶ .................................................... G06F 11/00
[52] U.S. Cl. .............. 395/704; 395/183.04; 395/183.11; 395/183.14; 395/183.21; 395/183.22; 395/500; 371/22.1; 364/578
[58] Field of Search .................................... 395/704, 708, 395/500, 183.14, 183.15, 183.21, 183.22, 183.13, 183.04, 183.06, 183.07, 183.11; 371/22.1; 364/578

[56] References Cited

U.S. PATENT DOCUMENTS

| | | | |
|---|---|---|---|
| 5,228,039 | 7/1993 | Knoke et al. | 395/183.04 |
| 5,371,689 | 12/1994 | Tatsuma | 364/569 |
| 5,450,586 | 9/1995 | Kuzara et al. | 395/700 |
| 5,491,793 | 2/1996 | Somasundaram et al. | 395/183.21 |
| 5,581,695 | 12/1996 | Knoke et al. | 395/183.04 |
| 5,604,895 | 2/1997 | Raimi | 395/500 |
| 5,611,044 | 3/1997 | Lundeby | 395/183.14 |
| 5,615,332 | 3/1997 | Yamamoto | 395/183.14 |
| 5,724,505 | 3/1998 | Argade et al. | 395/183.21 |
| 5,748,878 | 5/1998 | Rees et al. | 395/183.14 |
| 5,754,759 | 5/1998 | Clarke et al. | 395/183.13 |

*Primary Examiner*—Tariq R. Hafiz
*Assistant Examiner*—Tuan Q. Dam
*Attorney, Agent, or Firm*—Wilson Sonsini Goodrich & Rosati

[57] ABSTRACT

The present invention provides a method and an apparatus for analyzing the performance of a computer program inn a way that is accurate in light of prefetching caching operations. The method operates by inserting output sequences into a computer program. An output sequence is a sequence of instructions which cause the program to send an output through the data bus to an output terminal. A hardware analyzer records the output from the output terminal, and this output is used to calculate performance of the computer program. The present invention provides facilities to insert output sequences into executable code, thereby allowing performance analysis to take place without time consuming recompilation. The present invention requires only a small number connections from a hardware analyzer to output terminals connected to the processor data bus. This greatly simplifies the process of gathering data with a hardware analyzer. The present invention also provides for sending information to the output terminals in a format that indicates the progress of the program through subroutine and function calls.

40 Claims, 6 Drawing Sheets

SOFTWARE PERFORMANCE ANALYSIS USING HARDWARE ANALYZER

FIELD OF THE INVENTION

The present invention relates to methods for analyzing computer program performance, and more specifically to an apparatus and a method for analyzing computer program performance using a hardware analyzer, which detects output from sequences of code inserted into a computer program for purposes of performance measurement.

RELATED ART

In recent years, computer systems have grown increasingly more complicated as computer programmers add progressively more features to computer programs and as computer designers strive to squeeze ever-increasing performance from computer hardware. As computer programs and computers increase in complexity, it is becoming harder to analyze computer system performance, and consequently harder to identify bottlenecks in computer system performance.

A number of performance analysis techniques are presently employed, including processor emulators. Processor emulators are programs which run on general purpose computers and emulate the performance of a processor running a specific program as input. However, processor emulators typically run hundreds to thousands of times slower than the computational systems that they emulate. Hence, a program of any significant length running on a processor emulator will take a prohibitively long time to simulate.

Other methods for analyzing computer system performance include traditional debugging methods, such as inserting print statements into particular locations in a program. However, this approach is very time-consuming and can introduce inaccuracy into the performance measurement process by influencing the operation of the code being examined. Moreover, such print statements are difficult to use in embedded systems because the target processor on which the software is running must have an output port through which the print statements output their data.

Hardware analyzers, such as logic analyzers or digital oscilloscopes have been used to aid in debugging code and to analyze the performance of computer programs. Hardware analyzers are typically used to analyze computer system performance by monitoring processor bus cycles looking for occurrences of particular addresses or data words on a processor's address and data bus. Analyzing computer program performance in this way is a difficult if not impossible task, because it is difficult to correlate particular program instructions with corresponding processor bus activity.

One method for using a logic analyzer to debug computer program is disclosed in U.S. Pat. No. 5,450,586, entitled SYSTEM FOR ANALYZING AND DEBUGGING EMBEDDED SOFTWARE THROUGH DYNAMIC AND INTERACTIVE USE OF CODE MARKERS, by inventors Kuzara, et al. This patent discloses a system for inserting code markers into specific reserved locations at the entry and exit points of program modules. These code markers cause diagnostic data to be written to specific memory locations. A logic analyzer is connected to the address and data bus of a processor, and it records the references to the specific memory locations as the program runs on the processor.

This method has a number of disadvantages. It requires a logic analyzer to be connected to both a data bus and an address bus. In a 32bit system, this may require connecting a logic analyzer up as many as 80 pins. These pins may not be accessible in an embedded controller, in which address and data bus lines are not directly connected to external pins. Even if address and data bus lines are connected to external pins, such as in a microprocessor, the external pins may not be easily accessible if the microprocessor is housed in a standard pin grid array, in which hundreds of closely-spaced pins in a grid pattern protrude from the bottom of a semiconductor chip package. Connecting a logic analyzer to a pin grid array typically requires removing the pin grid array from its matching socket in the circuit board, inserting a special adaptor into the socket, and inserting the pin grid array into a matching socket on the opposite side of the adaptor. This process can be very time-consuming. It furthermore requires the computer system to be powered down and rebooted, which might destroy transitory computer system anomalies before they can be analyzed. Furthermore, monitoring a large number of pins requires time-consuming mapping of pins to address and data lines, as well as the complex process filtering of address patterns after triggering. Finally, buffer memory is typically limited in a logic analyzer, and recording the state of a large number of pins can consume a great amount of memory. Consequently, the logic analyzer can only record a limited number of data patterns.

The method disclosed in the above-mentioned patent also requires specific locations at entry and exit points of software routines to be reserved for the possible insertion of markers. Consequently, the method is not flexible because it only allows markers to be inserted at particular locations. The method also consumes a significant amount of memory because locations must be reserved even if markers are not placed in the locations. Memory space is of particular concern in microcontroller systems, in which memory is often extremely scarce. Providing additional memory locations for possible insertion of code markers also requires recompilation, which may affect the performance of the program in unpredictable ways.

Accordingly, prior art methods of analyzing computer program performance are excessively cumbersome, time-consuming, unreliable, or impracticable. What is needed is an efficient, non-intrusive method for measuring computer system performance, especially for embedded systems with limited memory resources.

SUMMARY

The present invention makes it possible for programmers to analyze the performance of computer programs using a hardware analyzer in a manner that is both efficient and non-intrusive. The invention operates by inserting output sequences into a computer program. Those output sequences are sequences of computer instructions which cause the processor to send a pre-defined pattern through the data bus to an output terminal. A hardware analyzer or digital oscilloscope is connected to the output terminal through which it gathers data that is used to calculate the performance of the computer program. Output sequences can be inserted at almost any location in the computer program.

Output sequences can also be inserted into executable code as well as source code versions of the program. When an output sequence is inserted into executable code, it replaces a portion of the executable code with another piece of executable code which performs the same functions as the executable code that was replaced, and additionally causes the processor to send an output to the output terminal. In this way, executable code can be analyzed without the time-consuming and unpredictable process of recompiling the original source code from which the executable code was derived. Alternatively, if output sequences are embedded into source code, the source code is first recompiled into executable code, and this executable code is then monitored analyzed.

The present invention provides a number of advantages. (1) It facilitates accurate performance measurements in light of pre-fetching and caching operations. (2) It can operate on object code, so that no time-consuming and unpredictable recompilation of the source code is required. (3) The method operates by connecting a hardware analyzer, such as a logic state analyzer or a digital oscilloscope, to only a few external pins on the computer system instead of an entire address bus and data bus. This is convenient in embedded systems, device controllers or other microprocessor systems in which address and data bus lines are not accessible to a hardware analyzer. Furthermore, a simple hardware analyzer with only a few input lines can be used. (4) The present invention does not use large amounts of extra memory. This is an important feature in embedded systems in which extra memory may be unavailable. (5) The present invention allows output sequences to be located almost anywhere in the computer code, not just at entry and exit points to subroutines or functions. This allows a wider range of specific performance measurements to be taken.

Thus, the present invention can be characterized as a method for analyzing the performance of a computer program which operates in a computer system including: a processor, a memory, an output terminal, an address bus and a data bus, the data bus coupled to the processor, the memory and the output terminal. The method operates by: inserting an output sequence into the computer code, the output sequence causing the processor to send an output through the data bus to the output terminal; connecting a hardware analyzer to the output terminal; running the computer code; monitoring the output terminal with the hardware analyzer to gather data; and calculating the performance of the computer code from the gathered data.

According to one aspect of the present invention, the step of inserting the output sequence into the computer code includes replacing original instructions in the computer code with the output sequence. According to another aspect of the present invention, the output sequence can be inserted at any instruction in the computer code.

The present invention can also be characterized as an apparatus for measuring performance of a computer code, comprising: a processor; a memory; an output terminal positioned and shaped to receive a connection to a hardware analyzer; and a data bus coupled to the processor, the memory, and the output terminal; wherein the memory includes resources for inserting at least one output sequence into the computer code, the output sequence causing the processor to send an output through the data bus to the output terminal.

In one embodiment of the present invention, the output sent through the data bus to the output terminal includes information on the progress of the processor through subroutine and function calls in the computer code.

The present invention can also be characterized as an apparatus for measuring performance of computer code, comprising: a processor, a memory, a data bus coupled to the processor and the memory, and an output terminal coupled to the data bus, the output terminal positioned and shaped to receive a connection from a hardware analyzer. In one variation of this embodiment, the apparatus includes: an address decoder; an address bus coupled to the address decoder; and a selector coupled to the data bus, the address decoder and the output terminal, the selector establishing a signal path between the data bus and the output terminal when the address decoder detects a specific address on the address bus.

DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
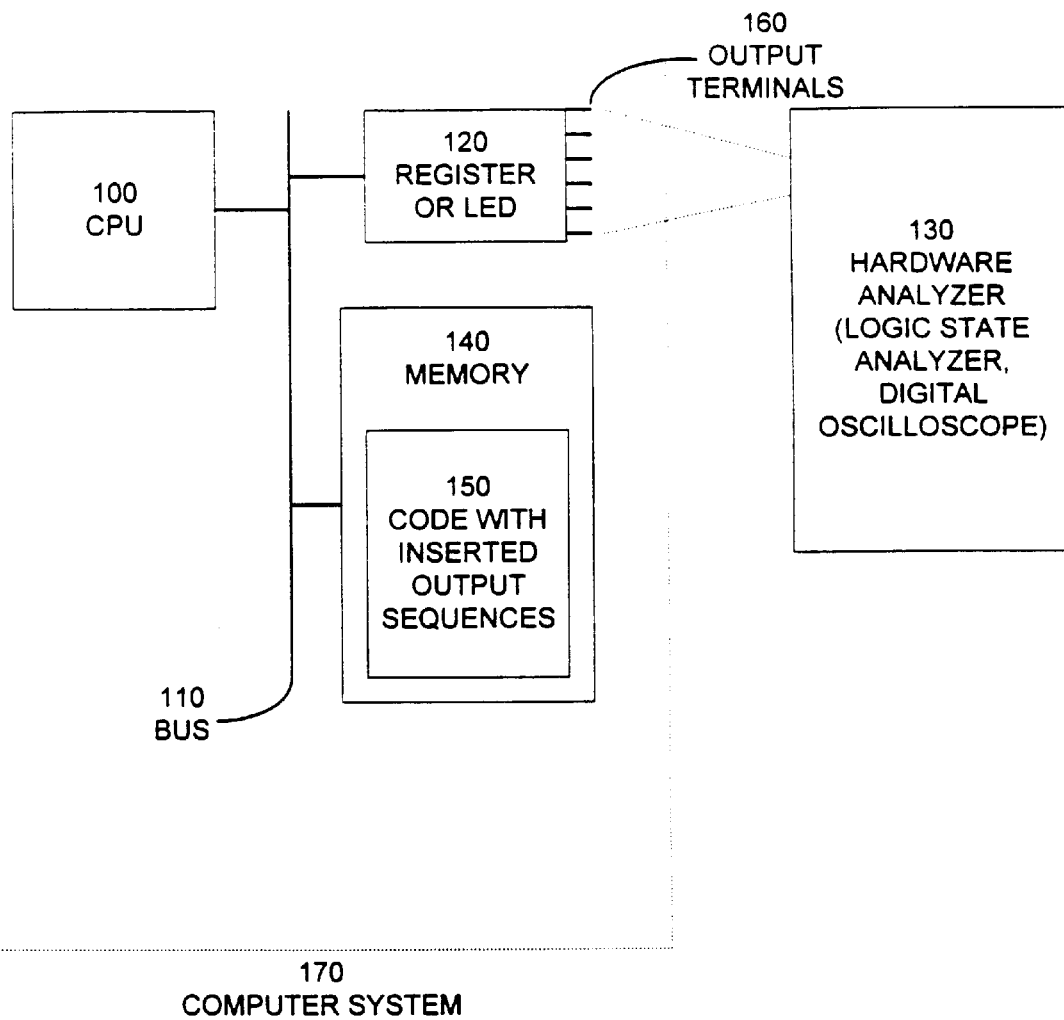
FIG. 1 is a block diagram illustrating how a computer system is connected to a hardware analyzer in accordance with an aspect of the present invention.

FIG. 1 is a diagram illustrating how a computer system is connected to a hardware analyzer in accordance with an aspect of the present invention. Computer system 170 includes bus 110, which connects to CPU 100, register or LED 120 and memory 140. Computer system 170 is any type of computer system including a device controller, an embedded system, a microprocessor system, or any other general or special purpose computing system which includes a processor and memory. CPU 100 is any type of central processing unit, such as a central processor unit in a microprocessor, or a central processor unit implemented in another technology.

Register or LED 120 is any type of register or other computer component, such as an LED, which can relay output from bus 110 to hardware analyzer 130. Register or LED 120 need not contain a memory element, such as a latch or a register. It only needs to drive the contents of a data bus line from bus 110 onto output terminals 160.

Output terminals 160 can be any type of externally accessible pins or leads which are coupled to the data bus.

One embodiment of the present invention uses reserved pins on a register, such as a control register, for output terminals. Another embodiment uses outputs to light emitting diodes (LEDs). Alternatively, register or LED 120 and output terminals 160 may take form of a specifically designed performance analysis output terminal which is described in more detail at a later point in this specification. Output terminals 160 connect to hardware analyzer 130.

Hardware analyzer 130 is any type of hardware analyzer, including logic analyzers, digital oscilloscopes and analyzers which record analog data. The only requirement is that hardware analyzer 130 be able to receive performance information from register or LED 120.

Memory 140 is any type of memory connected to a computer system. This includes semiconductor memory as well as memory on magnetic or optical storage devices. The only requirement is that memory 140 be able to store code which is executed by CPU 100. Inside memory 140 is code with inserted output sequences 150. This is the code that results after output sequences are inserted into a piece of computer code. In one embodiment of the present invention, memory 140 additionally includes software to perform the placement and insertion of output sequences into computer code to produce code with inserted outputs sequences 150. This software is described in more detail at a later point in this specification.

Figure 2:
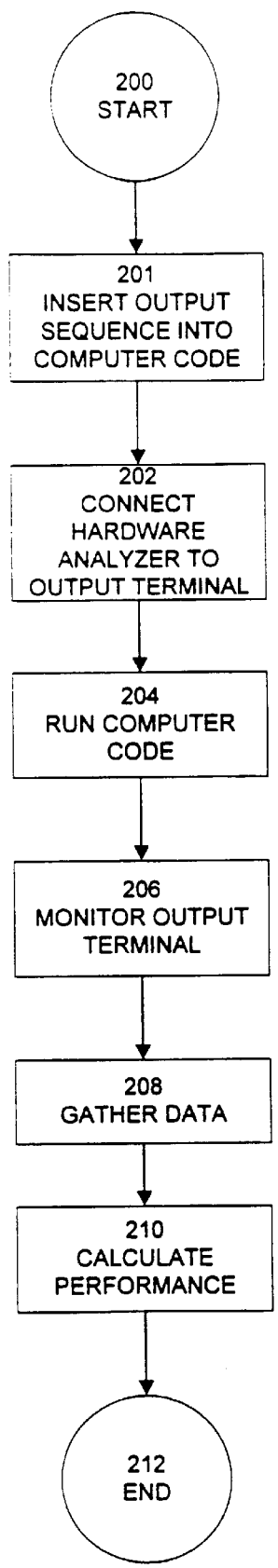
FIG. 2 is a flow chart illustrating the sequence of operations involved in analyzing performance of a computer program using a hardware analyzer in accordance with an aspect of the present invention.

FIG. 2 is a flowchart of the sequence of operations involved in measuring the performance of computer code in accordance with an aspect of the present invention. The systems starts at state 200, which is the start state. The system next proceeds to step 201.

At step 201, output sequences are inserted into the computer code. This can take place in a number of ways. If computer system 170 is a device controller or an embedded system without a display device or without sufficient memory space for the code to perform the insertion, the insertion takes place in a separate general purpose computing system. After the insertion is completed, the code with inserted output sequences 150 is loaded into memory 140. On the other hand, if computer system 170 has a display device and sufficient memory for software facilities to perform the insertion, this insertion can take place within computer system 170.

As mentioned above, this insertion takes place with the support of software to perform the insertion. In one embodiment, the insertion is performed by a system user through a debugger program. The system user manually inserts and moves specific instructions to insert the output sequence. In another embodiment, the insertion is performed by a system user through an in-circuit emulator (ICE). The system user selects strategic locations in the code, and subsequently executes the code using the in-circuit emulator. During the execution of the code, pre-defined patterns are written to output terminals when the strategic locations are reached. In yet another embodiment, a special software tool for insertion is used to locate and insert the output sequences into the code. This tool is described in more detail at a later point in this specification. The system then proceeds to step 202.

At step 202, hardware analyzer 130 is connected to output terminals 160. In one embodiment, output terminals 160 are any unused terminals of the computer system through which data can be outputted. This includes unused or reserved pins of a control register, or any other type of register. Alternatively, output terminals 160 are LED pins. In another embodiment, hardware analyzer 130 is connected to specially designed performance analysis output terminals, which are coupled to bus 110, and are positioned and shaped to receive a connection from hardware analyzer 130. The system then proceeds to step 204.

At step 204, code with inserted output sequences 150 has been loaded into memory 140. Code with inserted output sequences 150 is then run with a test input in order to test the performance of the code. The system then proceeds to step 206.

At step 206, hardware analyzer 130 monitors the output from output terminals 160 while the code is running. Hardware analyzer 130 is set to trigger on specific outputs to output terminals 160, which are generated by the output sequences within the code. These output sequences cause particular outputs to be written to register or LED 120, and ultimately to appear on output terminals 160. The system then proceeds to step 208.

At step 208, hardware analyzer 130 gathers data received by monitoring output terminals 160, and stores this data within a local buffer memory inside hardware analyzer 130. The amount of data that can be gather is limited by the memory capacity of hardware analyzer 130. The system then proceeds to step 210.

At step 210, the data which has been gathered is used to calculate a performance of the computer program. This performance can include execution time through different portions of a program, as well as a mapping of the execution pathway through the program. The system then proceeds to step 212 which an end state.

Figure 3:
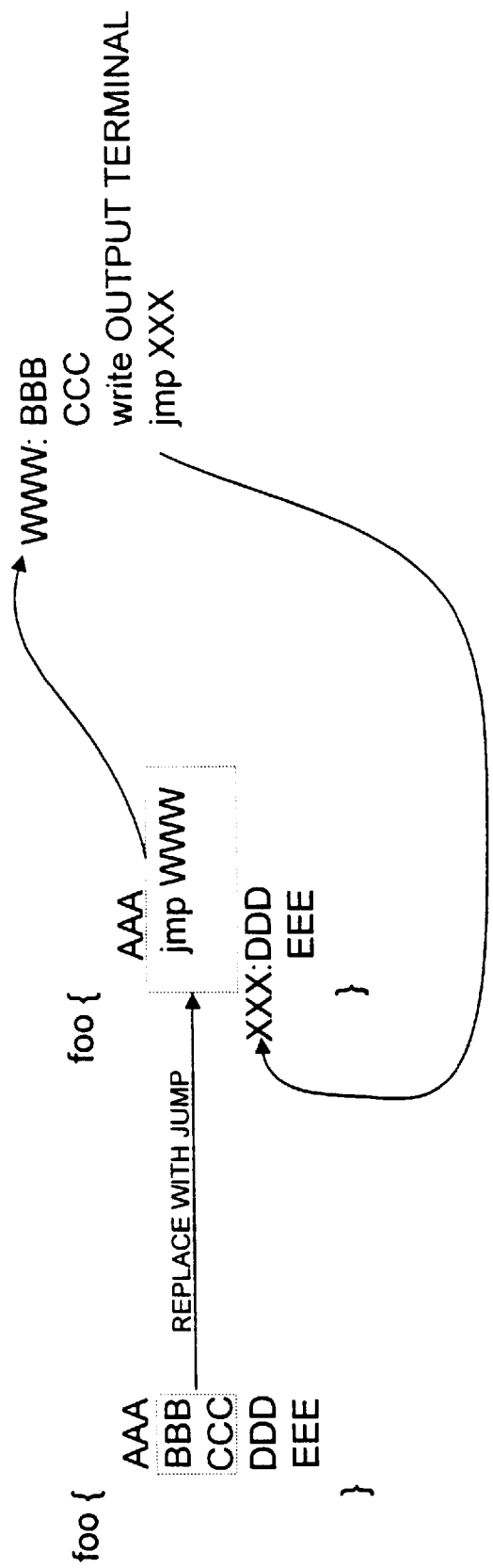
FIG. 3 is a diagram illustrating how a section of executable code is replaced with an output sequence, which sends an output through the data bus to an output terminal in accordance with an aspect of the present invention.

FIG. 3 illustrates a method for inserting an output sequence into a section of executable code in accordance with an aspect of the present invention. The original executable code is represented by the instructions on the left hand side of FIG. 3. In this example, Instructions BBB and CCC are replaced with an Instruction "jmp WWW." Note that "jmp WWW" takes the place of two instructions because the destination address WWW takes up an entire instruction word by itself. Instructions BBB and CCC are copied at location WWW, which is illustrated on the right-hand-side of FIG. 3. Additionally, after instructions BBB and CCC, there is an instruction to write a specified value to the output terminal. After the write operation, there is a jump to XXX, which is the location immediately following "jmp WWW." This returns the program to the location immediately following the inserted code to continue with program execution.

In another embodiment of the present invention, output sequences are inserted into the source code prior to compilation. In this case, replacement of executable instructions with output sequence instructions is not required because the compiler will rearrange the existing executable instructions to make room for the inserted output sequence instructions.

Figure 4:
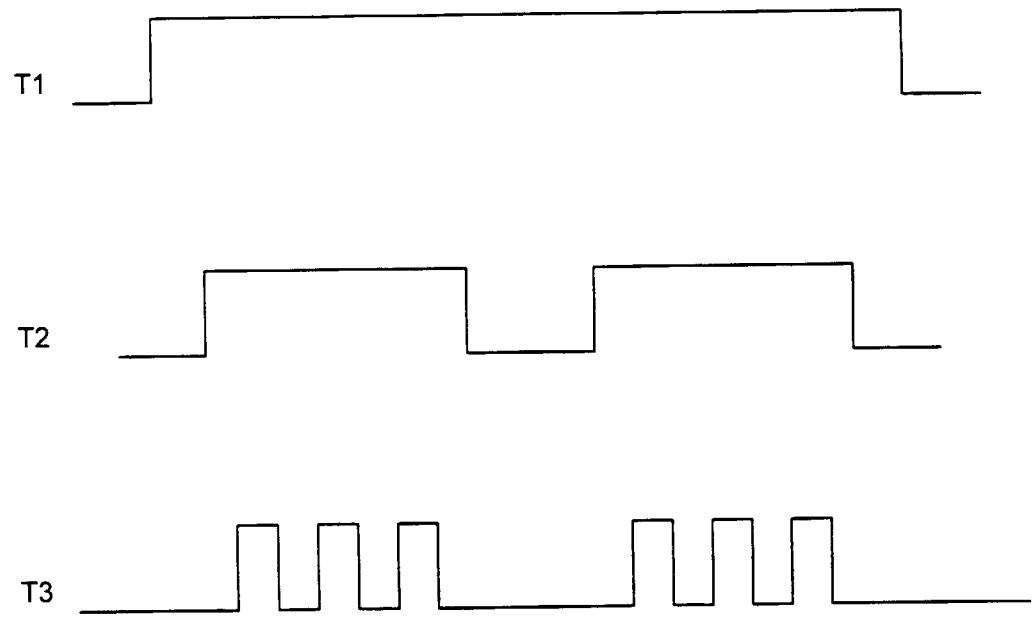
FIG. 4 illustrates an example of how information regarding the progress of the processor through subroutines and functions can be passed through the output terminal to the hardware analyzer in accordance with an aspect of the present invention.

FIG. 4 illustrates how data sent to the output terminal can include information on the progress of the program through the subroutine and function calls in accordance with an aspect of a present invention. At the top of FIG. 4 are three functions: A, B and C. Function A starts with a call to T1_HIGH, which causes output terminal T1 to assume a high value. Function A then executes other instructions including two calls to Function B. Finally, function A calls T1_LOW, which causes output terminal T1 to assume a low value. Function B starts with a call to T2_HIGH, which causes out terminal T2 to assume a high value. It then executes a number of instructions including a "for" loop, which repeatedly calls function C. Finally, function B calls T2_LOW, which causes output terminal T2 to assume a low value. Function C starts by calling T3_HIGH, which causes output terminal T3 to assume a high value. Function C then executes a number of instructions, and then calls function T3_LOW, which causes output terminal T3 to assume a low value.

Output terminals T1, T2 and T3 are monitored by hardware analyzer 130 to produce the diagram at the bottom of FIG. 4. This diagram illustrates the progress of the program through functions A, B and C. At any point in this diagram, it is possible to determine the nesting of functions A, B and C at a particular point in the execution of the program. This is unlike other performance analysis techniques, which merely trigger on address locations, and consequently may not be able to determine the nesting of function calls during a particular address reference.

Figure 5:
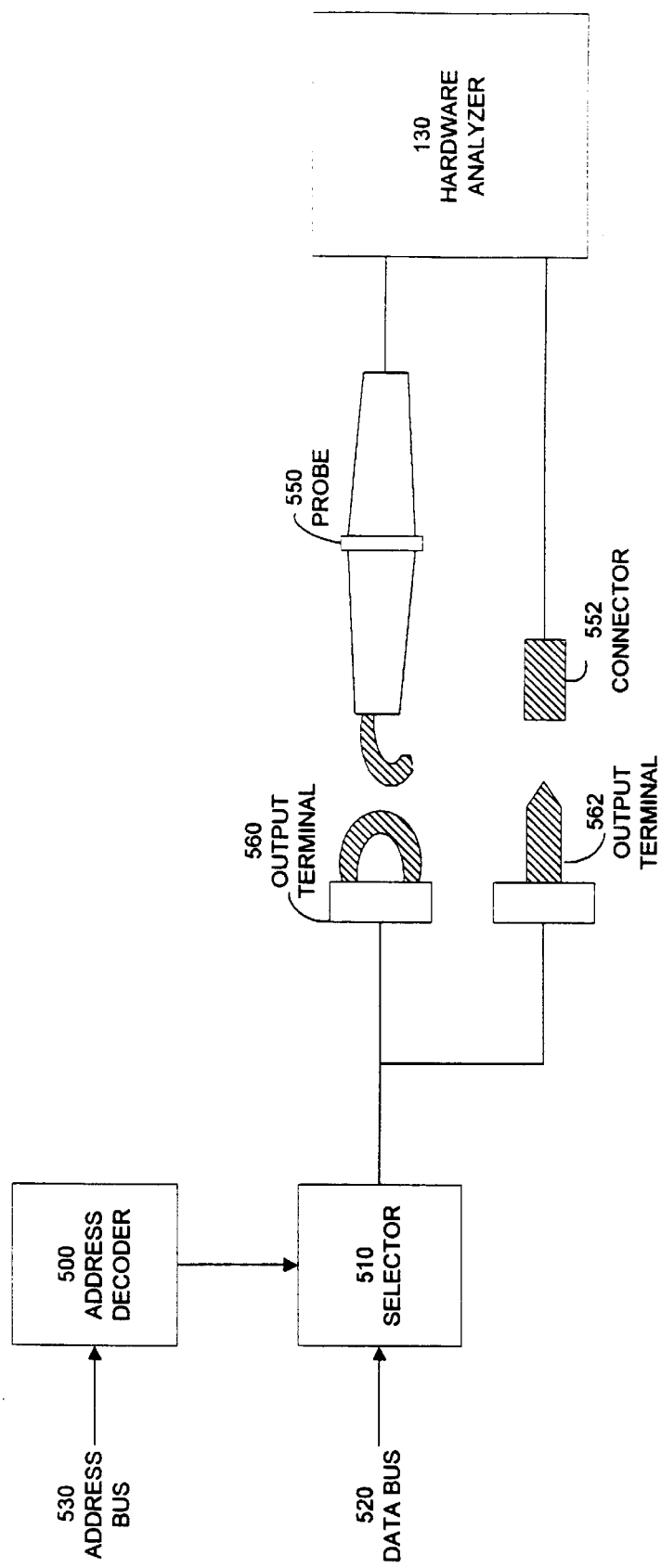
FIG. 5 is a diagram illustrating the structure of a dedicated output terminal for performance measurement which is positioned and shaped to receive a connection from a hardware analyzer in accordance with an aspect of the present invention.

FIG. 5 illustrates an implementation of an output terminal for performance analysis in accordance with an aspect of the present invention. FIG. 5 includes address decoder 500, which takes address bus 530 as an input and generates an output which feeds into selector 510. Selector 510 takes an additional input from data bus 520 and produces an output which feeds into output terminals 560 and 562. In one embodiment, at least an output terminal is coupled to the data bus and the address bus through a combinatorial logic arrangement as known in the art. Output terminal 560 is positioned and shaped to receive a connection from probe 550, which connects to hardware analyzer 130. Output terminal 562 is positioned and shaped to receive a connection from connector 552, which also connects to hardware analyzer 130.

The structure illustrated in FIG. 5 operates as follows. CPU 100 generates a write to the address of output terminals 560 and 562. Address decoder 500 recognizes the address of this write operation and activates selector 510 to output the contents of specific lines from data bus 520 to output terminals 560 and 562. Output terminals 560 and 562 connect to probe 550 and connector 552 respectively. These connections enable hardware analyzer 130 to record the output from data bus 520. In one embodiment, selector 510 does not include a memory element, and a line from data bus 520 is driven onto output terminals 560 and 562, through probe 550 and connector 552, and into hardware analyzer 130 which records the output. In another embodiment, selector 510 includes a memory element, which records outputs from data bus 520.

Note that the embodiment illustrated in FIG. 5 includes two differently-shaped output terminals, 560 and 562, connected to the same output line. This illustrates the fact that a number of different output terminal shapes can be used. The only requirement is that an output terminal be shaped to connect to a probe or connector from hardware analyzer 130. Other embodiments include only a single output terminal for each output line. In another embodiment, selector 510 couples a plurality of lines from data bus 520 to a plurality of output lines and output terminals. These connect to a plurality of probes or connectors from hardware analyzer 130.

Figure 6:
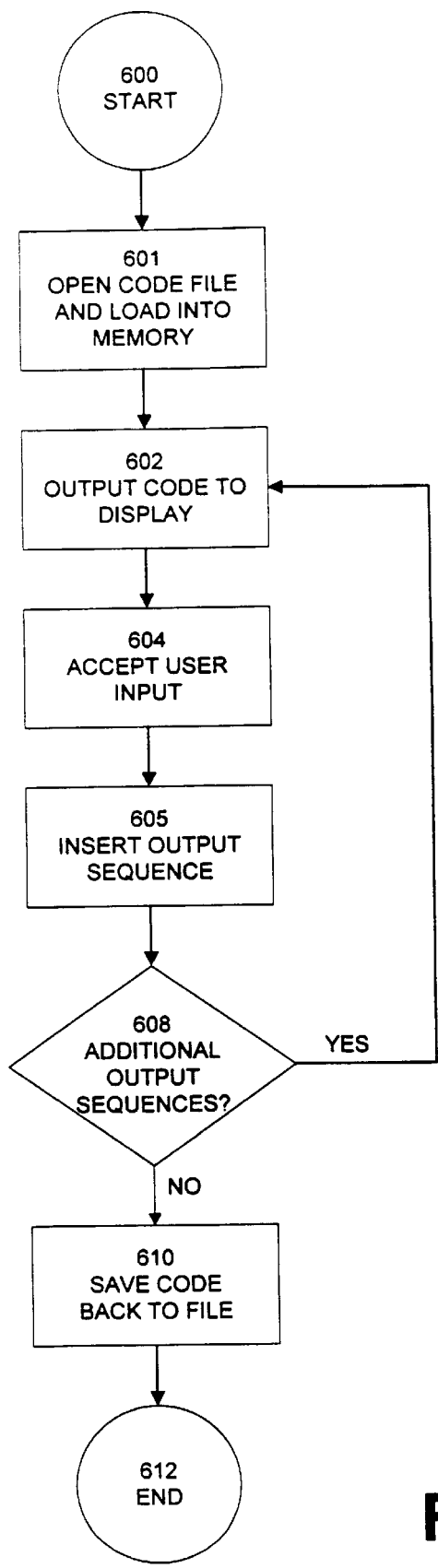
FIG. 6 is a flow chart of a program which inserts output sequences into program code in accordance with an aspect of the present invention.

FIG. 6 is a flowchart illustrating the operation of a program to insert output sequences into a program in accordance with an aspect of a present invention. The system starts at state 600 which is a start state. The system next proceeds to step 601. At step 601, the system opens a code file and loads the opened file into memory. The system next proceeds to step 602. At step 602, the system outputs the code to a display, so that a user can view the code. The system includes user interface facilities, which allow the user to navigate through and selectively view different portions of the code. The system next proceeds to step 604. At step 604, the system accepts user input from a user. This user input specifies the location and pattern of output sequences to be inserted into the code. The system next proceeds to step 606. At step 606, the system inserts the output sequence into the specified location in the code. The system next proceeds to step 608. At step 608, the system determines if there are additional output sequences to be inserted into the code. If not, the system proceeds to step 610. If so, the system returns to step 602 to repeat the sequence of operations for an additional output sequence. Steps 602, 604, 606 and 608 are repeated as necessary to insert all of the desired output sequences. After steps 602, 604, 606 and 608 are complete, the system processed to step 610, in which the code with the inserted output sequences is saved back to the code file. The system next proceeds to step 612, which is an end state.

The foregoing description of embodiments of the present invention have been presented for purposes of illustration and description only. They are not intended to be exhaustive or to limit the invention to the forms disclosed. Many modifications and variations will be apparent to practitioners skilled in the art.

What Is Claimed Is:

1. A method for analyzing performance of a computer code, the method operating in a computer system including, a processor, a memory, an output terminal, an address bus, and a data bus coupled to the processor, the memory and the output terminal, the method comprising the steps of:

inserting at least one output sequence into the computer code, the output sequence including a plurality of instructions which cause the processor to send an output through the data bus to the output terminal;

connecting a hardware analyzer to the output terminal;

running the computer code without recompilation;

monitoring the output terminal with the hardware analyzer to gather data; and calculating from the data a performance of the computer code.

2. The method of claim 1, wherein the step of inserting at least one output sequence into the computer code includes replacing an original instruction in the computer code with the at least one output sequence.

3. The method of claim 1, wherein in the step of inserting at least one output sequence into the computer code, the at least one output sequence can be inserted at any instruction in the computer code.

4. The method of claim 1, wherein in the step of inserting at least one output sequence into the computer code, the at least one output sequence is located at entry and exit points of functions in the computer code.

5. The method of claim 1, wherein the step of inserting at least one output sequence into the computer code is performed by a debugger program in the memory.

6. The method of claim 1, wherein the step of running the computer code is performed by an in-circuit emulator.

7. The method of claim 1, including the step of receiving user input into the computer system from a computer user, and wherein the step of inserting the at least one output sequence into the computer code uses the user input to determine where to insert the at least one output sequence into the computer code.

8. The method of claim 1, wherein the computer code is in executable form, and the step of inserting inserts the at least one output sequence into the computer code in executable form.

9. The method of claim 1, wherein:

the computer code is in executable form; and in the step of inserting the at least one output sequence into the computer code, the inserting replaces an original instruction in the computer code with an output sequence which causes the processor to send an output to the output terminal and to execute the original instruction.

10. The method of claim 1, wherein:

the computer code is in executable form; and in the step of inserting the at least one output sequence into the computer code, the inserting replaces an original instruction in the computer code with a part of an output sequence in the at least one output sequence, the output sequence including, a first jump instruction to jump to an outside location outside of the computer code, a copy of the original instruction at the outside location to perform the functions of the original instruction, an output instruction at the outside location, which causes the processor to send an output to the output terminal, and a second jump instruction at the outside location to jump back to a location immediately following the first jump instruction.

11. The method of claim 1, wherein the output terminal includes a plurality of output terminals.

12. The method of claim 1, wherein the output terminal includes fewer than eight output terminals.

13. The method of claim 1, wherein the output terminal connects directly to the data bus.

14. The method of claim 1, wherein the output terminal includes an unused output pin of a register coupled to the data bus.

15. The method of claim 1, wherein the output terminal is coupled to the data bus and the address bus through combinatorial logic.

16. The method of claim 1, wherein the output terminal is used only for purposes of performance analysis and debugging.

17. The method of claim 1, wherein the data gathered by the hardware analyzer includes timing information.

18. The method of claim 1, wherein the output sent through the data bus to the output terminal includes information on the progress of the processor through subroutine and functions calls in the computer code.

19. A method for analyzing performance of a computer code, the method operating in a computer system including, a processor, a memory, an output terminal, an address bus, and a data bus coupled to the processor, the memory and the output terminal, the method comprising the steps of:

inserting output sequences into the computer code, the output sequences including a plurality of instructions which cause the processor to send outputs through the data bus to the output terminal, wherein the output terminal is coupled to the data bus through a selector, the outputs including outputs regarding entry and exit of functions in the computer code;

connecting a hardware analyzer to the output terminal;

running the computer code;

monitoring the output terminal with the hardware analyzer to gather data; and calculating from the data a performance of the computer code;

wherein:

the computer code is in source code form;

the step of inserting inserts the output sequences into the computer code in source code form; and the method includes the step of compiling the computer code into executable form.

20. A method for analyzing performance of a computer code, the method operating in a computer system including, a processor, a memory, an output terminal, an address bus, and a data bus coupled to the processor, the memory and the output terminal, the method comprising the steps of:

inserting at least one output sequence into the computer code by replacing an original instruction in the computer code with the at least one output sequence, the output sequence including a plurality of instructions which cause the processor to send an output through the data bus to the output terminal;

receiving user input into the computer system from a computer user, the user input being used to determine where to insert the at least one output sequence into the computer code, connecting a hardware analyzer to the output terminal;

running the computer code without recompilation;

monitoring the output terminal with the hardware analyzer to gather data including timing information; and calculating from the data a performance of the computer code.

21. An apparatus for measuring performance of a computer code, comprising:

a processor;

a memory;

an output terminal positioned and shaped to receive a connection to a hardware analyzer; and a data bus coupled to the processor, the memory and the output terminal;

wherein the memory includes resources that insert at least one output sequence into the computer code, the output sequence including a plurality of instructions which cause the processor to send an output through the data bus to the output terminal;

wherein the resources that insert at least one output sequence into the computer code include resources that replace an original instruction in the computer code with the at least one output sequence.

22. The apparatus of claim 21, wherein the memory includes a semiconductor memory and disk drive.

23. The apparatus of claim 21, wherein the resources that insert at least one output sequence into the computer code include resources which allow the at least one output sequence to be inserted at any instruction in the computer code.

24. The apparatus of claim 21, wherein the resources that insert the at least one output sequence into the computer code include resources to locate the at least one output sequence at entry and exit points of functions in the computer code.

25. The apparatus of claim 21, wherein the resources that insert the at least one output sequence into the computer code are within a debugger program in the memory.

26. The apparatus of claim 21, wherein the resources that insert the at least one output sequence into the computer code are within an in-circuit emulator.

27. The apparatus of claim 21, including a user interface for receiving input into the computer system from a computer user, and wherein the resources that insert the at least one output sequence into the computer code include resources which use the user input to determine where to insert the at least one output sequence into the computer code.

28. The apparatus of claim 21, wherein the computer code is in executable form, and the resources that insert the at least one output sequence into the computer code include resources to insert the at least one output sequence into the computer code in executable form.

29. The apparatus of claim 21, wherein:

the computer code is in executable form; and the resources that insert the at least one output sequence into the computer code include resources that replace an original instruction in the computer code with an output sequence which causes the processor to send output to the output terminal and to execute the original instruction.

30. The apparatus of claim 21, wherein:

the computer code is in executable form; and the resources that insert the at least one output sequence into the computer code include resources to replace an original instruction in the computer code with an output sequence in the at least one output sequence, the output sequence including, a first jump instruction to jump to an outside location outside of the computer code, a copy of the original instruction at the outside location to perform the functions of the original instruction, an output instruction at the outside location, which causes the processor to send an output to the output terminal, and a second jump instruction at the outside location to jump back to a location immediately following the first jump instruction.

31. The apparatus of claim 21, wherein the output terminal includes a plurality of output terminals.

32. The apparatus of claim 21, wherein the output terminal includes fewer than eight output terminals.

33. The apparatus of claim 21, wherein the output terminal connects directly the data bus.

34. The apparatus of claim 21, wherein the output terminal includes an output pin of an unused bit in a register coupled to the data bus.

35. The apparatus of claim 21, wherein the output terminal is coupled to the data bus and the address bus through combinatorial logic.

36. The apparatus of claim 21, wherein the output terminal is used only for purposes of performance analysis and debugging.

37. The method of claim 21, wherein the output sent through the data bus to the output terminal includes information on the progress of the processor through subroutine and functions calls in the computer code.

38. An apparatus for measuring performance of a computer code, comprising:

a processor;

a memory;

an output terminal positioned and shaped to receive a connection to a hardware analyzer; and a data bus coupled to the processor, the memory and the output terminal, wherein the output terminal is coupled to the data bus through a selector;

wherein the memory includes resources that insert output sequences into the computer code, the output sequence including a plurality of instructions which cause the processor to send outputs through the data bus to the output terminal, the outputs including outputs regarding entry and exit of functions in the computer code;

wherein:

the computer code is in the source form;

the resources that insert the output sequences into the computer code insert the output sequences into the computer code in source code form; and including resources that compile the computer code into executable form.

39. An apparatus for measuring performance of a computer code, comprising:

a processor:

a memory;

a data bus coupled to the processor and the memory;

an output terminal coupled to the data bus, the output terminal positioned and shaped to receive a connection from a hardware analyzer;

an address decoder;

an address bus coupled to the, address decoder; and a selector coupled to the data bus, the decoder and the output terminal, the selector establishing a signal path between the data bus and the output terminal when the address decoder detects a desired address on the address bus.

40. A method for analyzing performance of a computer code, the method operating in a computer system including, a processor, a memory, an output terminal, an address bus, and a data bus coupled to the processor, the memory and the output terminal, the method comprising the steps of:

inserting at least one output sequence into the computer code, the output sequence including a plurality of instructions which cause the processor to send an output through the data bus to the output terminal;

connecting a hardware analyzer to the output terminal;

running the computer code;

monitoring the output terminal with the hardware analyzer to gather data; and calculating from the data a performance of the computer code;

wherein the step of inserting at least one output sequence into the computer code includes replacing an original instruction in the computer code with the at least one output sequence.

* * * * *